Oct. 23, 1962     H. C. THEUERER     3,060,123
METHOD OF PROCESSING SEMICONDUCTIVE MATERIALS
Filed Dec. 17, 1952

INVENTOR
H. C. THEUERER
BY David H. Wilson Jr.
ATTORNEY

United States Patent Office 3,060,123
Patented Oct. 23, 1962

3,060,123
METHOD OF PROCESSING SEMICONDUCTIVE
MATERIALS
Henry C. Theuerer, New York, N.Y., assignor to Bell
Telephone Laboratories, Incorporated, New York,
N.Y., a corporation of New York
Filed Dec. 17, 1952, Ser. No. 326,561
7 Claims. (Cl. 252—62.3)

This invention relates to the processing of fusible materials and more particularly to techniques for eliminating the contamination of such fusible materials by their containers. The processes herein described are of particular importance as applied to the processing of high purity semiconductive materials for use in semiconductor translators such as transistors and diodes.

The terminology "fusible materials" as here used connotes any material which may be caused to undergo a phase transformation from solid to liquid and back to solid without resulting in any deleterious chemical change. Further requirements of materials to be processed in accordance with this invention are that there be contained in the fusible material at least one solute which has a different concentration in adjoining solid and liquid phases at equilibrium and that the phase change from solid to liquid and back to solid be such that it may be brought about thermally. This solute is generally referred to herein as "minor ingredient." In a special case in which the fusible material is an extrinsic semiconductive material, this solute may be referred to as "significant solute" or "significant impurity." As is well known in the art the use of this latter terminology has reference to a material which when added in very small amounts to a certain type of semiconductive material affects the conductivity properties of the semiconductive material. Semiconductive materials which are so affected are known as "extrinsic semiconductors" and the conductivity produced in such materials by the addition of such significant impurities is known as "extrinsic conductivity."

It is known that many metalloid and metallic materials are contaminated by the materials with which they come in contact while in a molten state. Crucible contamination has become particularly troublesome in the case of the semiconductors silicon and germanium with the advancement of refining techniques to their present state whereby materials are produced of such high purity that they approach intrinsic conductivity at room temperatures, i.e., conduction by charge carriers contributed by impurities is substantially eliminated.

While this problem of contamination is present in the processing of both silicon and germanium it is particularly troublesome in the production of high purity silicon since molten silicon has a strong affinity for many materials and wets and is contaminated by all known crucible materials.

An object of this invention is to eliminate or materially reduce the contamination of molten metalloids and metals and particularly of silicon and germanium from the apparatus employed in handling the material, thereby facilitating the production of material of higher purity than has been obtained heretofore.

Other objects of the invention are to facilitate the attainment of a prescribed impurity content in a semiconductor, to reduce variations in the composition of metallic bodies containing trace impurities and to simplify the production of single crystals of metals and particularly of silicon and germanium.

In accordance with the above objects, a feature of this invention resides in utilizing surface tension to maintain a melt of a metalloid or metal between two solid portions a melt of a metalloid or metal between two solid portions of the same general material of that material thereby eliminating the melt contaniers as a source of contamination.

The terminology "surface tension" as used in this description and in the appended claims is intended to connote all of the forces responsible for holding a molten portion between two distinct solid portions wherein the molten portion presents a free surface which, during a substantial portion of the processing, as will be described, is contacted only by the atmospheric gas which is maintained in the apparatus. Where the process is carried out in a vacuum even this slight retaining influence is absent. The major forces included in this grouping are the adhesive forces between the molten portion and the solid portions at two interfaces and the cohesive forces within the molten portion itself.

A feature of this invention resides in controlling the distribution of impurities in a metalloid or metallic body without introducing further impurities from containers by establishing a molten zone in the body which may be in bar form, maintaining the molten zone solely by surface tension between two relatively fixed ends of the body, and passing the zone along the length of the body. Impurities are picked up in the molten zone and carried to another portion of the body by that zone in this process.

The above and other objects and features of this invention will be more fully appreciated from the following detailed description of several illustrative embodiments when read with reference to the accompanying drawings in which.

Figure 1:
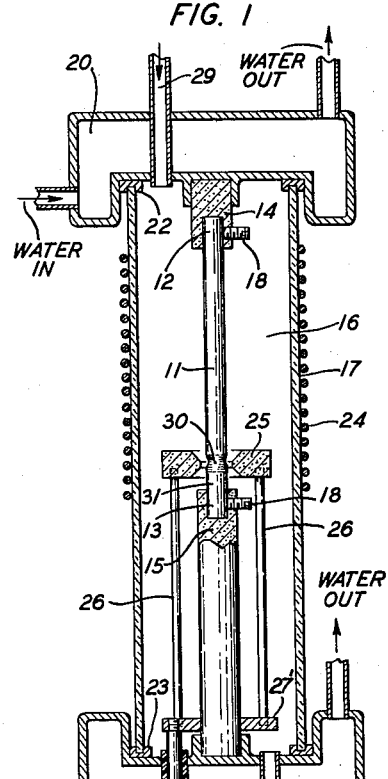
FIG. 1 is a schematic view of apparatus for performing refining and single crystal growing operations according to this invention.

It is now well established that the electrical characteristics of electronic semiconductors depend upon the electrons and positive charge carriers, holes, available in the material. Further, it is known that the numbers of electrons and holes in the elemental semiconductors silicon and germanium can be adjusted by controlling the impurities present. Those impurities which affect the number of charge carriers available will be referred to as significant impurities. Thus some impurities from the third column of the periodic table including boron, aluminum, gallium and indium, enter the silicon or germanium crystal lattice and provide a deficit of one electron per impurity per atom; these hole producing impurities are known as acceptors. Similarly certain impurities from the fith column of the periodic table provide the crystal structure with an excess electron for each impurity atom; these impurities are known as donors and include phosphorous, arsenic, antimony and bismuth.

At low concentrations of impurity, acceptors and donors can be employed to counterbalance each other so that the net predominance is the effective concentration of impurity. Thus it is possible to adjust the resistivity and conductivity type, n-type where electrons are the predominating charge carriers and p-type where the holes predominate, by adjusting the predominance of impurity. In certain applications, however, it is desirable to produce silicon or germanium bodies of extremely high purity wherein the conductivity approaches that value at which the only charge carriers available for conduction are those thermally excited from the valance band to the conduction band, i.e., intrinsic conductivity.

Heretofore crucible contamination of the product has occurred in the attempts to produce high purity silicon. No refractory material is known which will not contaminate silicon with acceptor or donor impurities at its melting temperature, above about 1400° C., at a higher rate than these impurities can be removed in the later stages of refining by known refining processes. The crucible problem in the case of silicon is further complicated by its property of wetting all known usable refractory materials and of expanding on freeizng. An ingot of silicon often burst upon freezing due to the internal stresses developed and those developed between it and its crucible. To eliminate the effect of these destructive stresses it has been found necessary in some instances to maintain the crucible and melt in a high temperature soak to devitrify the crucible so that it breaks on the freezing of the ingot before destructive stresses are produced in it. This high temperature soak extends the interval of exposure to the contaminating refractory and thus increases the silicon contamination. A similar problem of crucible contamination may place an upper limit on the attainable purity of germanium refined according to prior processes although crucible contamination is not as serious as in the case of silicon.

Similarly, crucible contamination of other metallic materials has been extremely difficult to eliminate. Thus, for example, the refining of copper and the production of hyperpure single crystals of copper have been successful only to a limited degree due to contamination from the crucibles which it has heretofore been necessary to employ. Magnetic iron is another material which is seriously contaminated by impurities from the crucibles employed. The present invention is applicable to the redistribution of impurity and the growth of single crystals of the above mentioned and other metals. Although the detailed description has been directed principally to the treatment of silicon and germanium, it is to be understood that such techniques as described or referred to herein, modified so that the parameters employed are appropriate for the metal to be treated, are included within the scope of this invention.

In the present process, the containers for the molten silicon or germanium are eliminated and the molten mass is sustained between two solid portions of the solid body being processed by cohesive forces within the molten mass and adhesive forces between the molten mass and the said solid portions by restricting its shape and size so that the stresses to which the mass is subjected are insufficient to overcome the sustaining forces. This concept has been applied to a number of processing techniques all of which include the steps, of avoiding undesirable chemical reactions with the environment by removing substantially all oxidizing constituents therefrom, adding material to the molten mass by advancing one interface between the molten mass and a solid portion, maintaining the molten material in position between two solid portions of the body undergoing processing by cohesive forces within the molten mass and adhesive forces between the molten mass and the solid portions, and progressively freezing the molten material at the other interface between the molten mass and a solid portion.

An impurity redistributing technique somewhat similar to that disclosed in Patent No. 2,739,088, issued March 20, 1956, by W. G. Pfann, utilizing the concepts of this invention may be practiced in accordance with the teachings of this invention. In accordance with that patent a minor ingredient is redistributed in a fusible solid by passing one or more molten zones through the fusible solid, the minor ingredient being soluble to some extent in both the solid and the molten phase, and being such that the concentration of this minor ingredient is different in adjoining solid and liquid phases at equilibrium.

In one species of the process described in the above-cited Pfann patent, the concentration of minor ingredient and the volume of the molten zone are such that during a single pass of the molten zone through the treated portion of the solid body the concentration of minor ingredient in the molten zone attains a value such that it is in equilibrium with the concentration of the minor ingredient in the solid body at the freezing or trailing interface of the molten zone with the solid body. Such a single-pass zone-melting process sometimes referred to as "zone-leveling" results in an end product having uniform distribution of the minor ingredient on a microscale over some portion of the treated part of the body. The equilibrium state is conveniently referred to in terms of the fraction $C_0/\gamma$ in which $C_0$ is defined as the average concentration of minor ingredient in the body and $\gamma$ is defined as the proportionality constant equal to the ratio of the concentration of the minor ingredient in the solid to that in the liquid.

Another species of the zone-melting process described in the Pfann patent is that in which the value $C_0/\gamma$ is not attained over a substantial portion of the traversal of the solid body by the molten zone. Where it is desired to concentrate the minor ingredient in some portion of the solid body, this species is sometimes referred to as "zone-refining." Where the equilibrium concentration of the minor ingredient in the molten zone is greater than that in the solid body, this concentration of minor ingredient occurs at the terminal position of the molten zone after its traversal. If the equilibrium concentration of minor ingredient in the molten zone is less than that of the concentration of minor ingredient in the solid body, the concentration of minor ingredient in the treated body occurs at the initial position of the molten zone before traversal. Since the concentration of minor ingredient in such a process is increased by successive traversals of new molten zones, such a zone-refining process is seldom carried out with but a single passage of such a zone.

Both the zone-leveling and zone-refining processes of the above-cited Pfann patent have found application to the treatment of semiconductive materials for use in transistors and other semiconductor translating devices. Where such use is described in this specification and in the appended claims, use will be made of the terminology of the semiconductor field. In accordance with such terminology the fusible material undergoing treatment is referred to as fusible extrinsic semiconductive material and the minor ingredient in which interest is concentrated is referred to as "significant minor ingredient," "significant solute" or "significant impurity." As is well known in the semiconductor field, extrinsic semiconductive materials are those which owe at least some of their electrical properties to the presence in amount and kind of very small amounts of significant impurities. Well-known extrinsic semiconductive materials which are fusible and which, therefore, may be processed in accordance with the Pfann patent and also in accordance with the instant invention are germanium and silicon including as significant impurities elements of Groups III and V of the Periodic Table according to Mendelyeev. In this process referring again to FIG. 1, a body 11 of silicon or germanium in rod or bar form prepared in any suitable manner as by casting or cutting is supported at both ends 12 and 13, for example with chucks 14 and 15, in a chamber 16. The body 11 preferably is of the highest purity attainable by prior processes and all elements in its environment are of materials of the highest purity. The wall 17 of chamber 16 may be pure clear silica, while the chucks 14 and 15 may be of spectroscopically pure graphite bored and tapped for graphite clamping screws 18. The ends of chamber 16 are closed with water cooled metal heads 20 and 21 sealed to the silica walls with lead gaskets 22 and 23.

A zone 30 in the bar adjacent one end is melted for example by an induction heater comprising the induction coil 24 mounted on the chamber wall 17 and a spectroscopically pure graphite heater 25 in the form of a ring surrounding the zone. The heater ring has a double taper on its inner surface to concentrate its heat in a narrow zone in the adjacent semiconductive body 11. This heater ring is arranged for movement along the axis of body 11 by means of graphite support columns 26, and a drive mechanism including a shaft 27 and associated annular platform 27' providing a mechanical linkage which can be advanced along the chamber axis. The shaft 27 passes through a seal 28 in the chamber head 21 which permits its axial movement. It is to be noted that all elements which are positioned within the induction coil are spectroscopically pure graphite in order to avoid any contamination due to the degassing of the material at the high temperatures they reach.

In redistributing the impurity in the rod 11, the heating chamber is first flushed with a dry, chemically pure, nonoxidizing gas such as helium, nitrogen or hydrogen by passing the gas through feed tube 29 and exhaust tube 29' to remove substantially all oxidizing constituents from the environment of the rod. Next the graphite heater ring 25 is positioned around the rod 11 near its lower end 13 and energy is applied to the induction coil. A zone 30 of material of restricted axial extent and extending completely through rod 11 is raised above the melting temperature of the material being refined by heater 25. Generally it has been found that a molten zone of silicon or germanium will be mechanically stable when sustained solely by its surface tension when its axial length is limited to about the diameter of the rod for rods of less than one-half inch diameter. This elimination of contact by the melt with elements which might carry contaminants produces a higher purity product.

While induction heating is disclosed in the present process, it is to be understood that other forms of heaters might be employed. Induction heating causes a stirring of the material in the molten zone thereby facilitating the uniform distribution of impurities therein; however excessive stirring may break the surface constraining the melt on the matrix and thereby interrupt the process. It has been found that energizing frequencies of between 20 and 30 kilocycles stir the melt without overcoming the effects of surface tension. Melts heated inductively from a 450 kilocycle source do not appear to be stirred. Another advantage of induction heating particularly where the molten zone has a free major surface, resides in the tendency of the field to build up and maintain the molten-material in the center of the field, thereby aiding the sustaining action of surface tension.

Figure 2A:
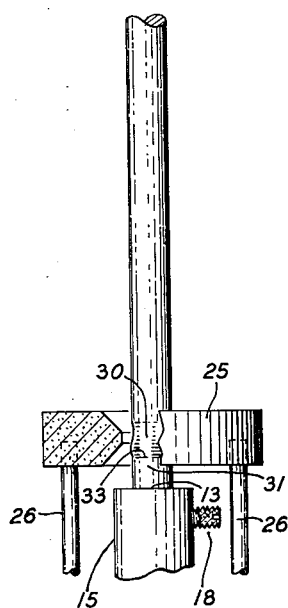
FIGS. 2A and 2B depict a body processed in the apparatus of FIG. 1 according to one embodiment of this invention, at successive points in the process.
Figure 2B:
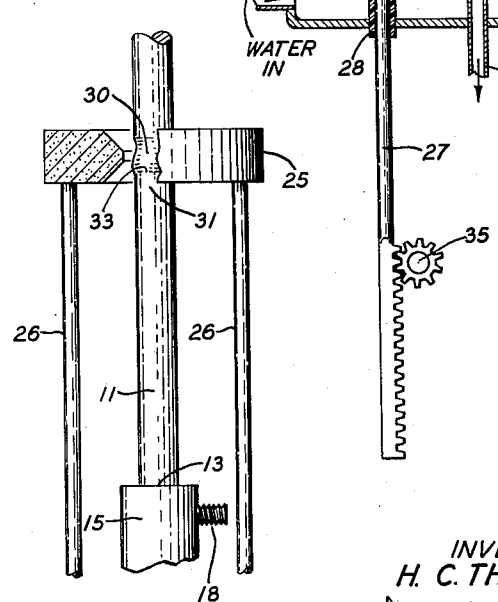

The rod 11 at this stage of the processing assumes the form shown in FIG. 2A wherein the lower portion, end 13, constitutes a matrix 31 on which the molten material in the zone 30 is progressively frozen. When the fluid zone has been established at its desired size, it is advanced along the axis of the rod 11 by the advancement of the heater 25 through the actuation of shaft linkage 27 and supports 26 by driving means 35. This advancement of zone 30 so that it progressively incorporates portions of the rod separated from the matrix by the zone effectively amounts to feeding material into the zone as shown in FIGS. 2A and 2B. The rate of advancement may be so correlated with the melting rate at the upper or leading face 32 of zone 30 and with the freezing rate at the interface 33 between the zone and the matrix 31 that the axial extent of the molten zone remains within limits which can be sustained by surface tension.

The effect of passing a molten zone through the length of a rod of silicon or germanium is discussed extensively in the above-cited Pfann patent. The process redistributes impurities in a semiconductive body. This redistribution results from differences in the concentration of the number of impurity molecules in the liquid and solid phases of the material at equilibrium at the interface between the phases. Thus for example, where the concentration of impurity at equilibrium in the liquid is greater than that in the solid at equilibrium at the liquid solid interface, the effect of passing a molten zone along the body is to concentrate the impurity in the final portion to freeze. This process results in refining the portion of the body through which the zone was passed since the molten zone picks up impurities until its impurity concentration reaches that value at which the corresponding solid equilibrium has the same impurity concentration as the material being melted.

Single or multiple passes of a molten zone in a single direction can be employed to concentrate impurity at one end of the pass and a more uniform distribution of impurity can be effected by a final reverse pass.

Rods of silicon 3 inches long and ¼ inch diameter have been refined by supporting them vertically with their ends in axially aligned chucks, establishing a molten zone about ¼ inch long along their axis, and passing the zone along the length of the rods at a rate of between ⅛ and ¹⁄₃₂ inch per minute. The power was supplied to the induction coil at 30 kilocycles in these runs.

It has been observed that excessive vibration in the equipment employed in this process cannot be tolerated and that the heat supplied by the heater should be constant to avoid collapsing the molten zone. Therefore the work should be mounted so that it is not subjected to such magnitudes of vibration that the constraining forces of surface tension on the melt are overcome. Further, precautions should be taken to avoid changes in the induction coil field strength applied to the heater ring, since increases in this field may extend the zone beyond that axial length which can be supported by surface tension. Constant heat can be obtained by proper design of a stationary induction coil to provide a uniform field along the length of the rod to be treated or by maintaining the special relationship between the coil and heater and moving them together relative to the rod. Where it appears that the zone is being unequally heated across its cross section, it can be continuously rotated in the chamber by rotating the lower portion of the rod with the major axis of the rod disposed substantially vertical.

This technique of zone refining without a crucible can be utilized for the growth of single crystals of a desired orientation with the apparatus disclosed in FIG. 1. A single crystal may be grown by employing a seed having the orientation desired as a growing matrix, mounting it in the chuck at the end from which the zone is passed, suspending a rod from the chuck at the other end of the growing chamber with its free end in contact with the free face of the crystal seed, establishing the molten zone at the seed-rod interface so that it extends from the rod to the seed, and advancing the zone along the rod. The molten material at the seed-zone interface will be maintained by surface tension if the axial length is held within the proper limits and will progressively freeze with the same orientation as the seed as the molten zone is advanced.

The growth rate of single crystals does not appear to be critical. It appears that satisfactory growth will be realized provided all freezing of the molten material proceeds from the solid growing interface, thereby maintaining a single crystal orientation corresponding to that of the solid material at that interface, and provided a concave downward growing face is avoided i.e., the growing face should be either planar or slightly convex. It is convenient to employ freezing rates of from ¹⁄₃₂ inch per minute to of the order of ¼ inch per minute in the practice of most of the techniques disclosed herein, although it is to be recognized that the rate cannot be so slow relative to the rate at which the melting interface progresses that the zone grows beyond that size which is sustained by cohesive forces within the molten zone itself and adhesive forces between the molten zone and the solid portions of the body undergoing processing.

While it has been the usual practice to grow the body along a vertical axis in the practice of the various aspects of this invention, other growth positions may be employed while utilizing surface tension to sustain a molten zone, for example the direction of progression of the molten zone could be horizontal and the bending effects of gravity on the growth avoided by continuously rotating either or both solid portions of the body.

In the processes according to this invention an initial portion of the body being grown must be solid to provide an interface on which the remainder of the body is grown, in the case of the refining process to supply the necessary base of low impurity content for the surface tension supported molten zone and in the case of single crystal growth, to provide that base and establish the crystal orientation determining subsequent growth. However, it is not necessary that the solid matrix be produced prior to the initiation of this process. For example, this matrix might be produced on a suitable refractory base by applying a mass of finely divided particles to the base, sintering this mass (thereby avoiding heating the mass to a molten state wherein impurities readily migrate from the refractory into it), establishing a molten zone on the sintered mass at a portion spaced from the refractory base, and progressively freezing this zone from its interface with the sintered matrix. Thus the matrix for the body being grown is supported outside the high fields of the induction coil or the supporting base for the matrix is cooled by some means such as circulating water to prevent the melting of that portion of the matrix which is in contact with the base.

It is to be understood that the disclosed embodiments are illustrative of the principles of the invention. Numerous other arrangements may be devised by those skilled in the art without departing from the spirit and scope of the invention.

What is claimed is:

1. The process of successively zone-melting and re-solidifying an elongated body of fusible material which comprises supporting said body at both ends in a vertical position, applying heat to establish a molten zone extending throughout the entire cross-section of the body, the length of said molten zone being such that the molten material is prevented from escaping solely by virtue of cohesive and adhesive forces, and displacing said molten zone in an axial direction along said body.

2. A method of producing, in an elongated rod-shaped body of fusible solid containing a minor ingredient, uniform distribution of said minor ingredient on a microscale over a substantial portion of its volume, which method comprises disposing the said body with its major axis substantially vertical, establishing in said body a molten zone extending through the entire cross-section of the said body so as to produce two solid-liquid interfaces between the said zone and the said body, causing the said molten zone to traverse at least a portion of said body by progressively melting the material of the said body at one solid-liquid interface and progressively freezing the material of the said zone at the second solid-liquid interface, the progressive melting and freezing being carried out at substantially the same rate, in which contact between the molten material and solid material is confined to that at the two said interfaces during a substantial portion of the said traversal, the dimensions of the molten zone being such that the molten material is prevented from escaping at any surface not in contact with solid by virtue of adhesive forces between the molten and solid materials at the said interfaces and by virtue of cohesive forces within the molten material itself, the volume of the said molten zone being such that the concentration of said minor ingredient attains a value of $C_0/\gamma$ before the said molten zone completely traverses the said body during the said substantial portion of the said traversal in its direction of travel, where $C_0$ is the average concentration of said minor ingredient in said body and $\gamma$ is the proportionality constant equal to the ratio of the concentration of the said minor ingredient in the solid to that in the liquid, the said minor ingredient being soluble to some extent in the fusible material in both solid and the molten phases and the concentrations of the said minor ingredient being different in adjoining solid and molten phases at equilibrium.

3. The process of claim 2 in which the fusible solid is silicon.

4. A method of producing an elongated rod-shaped body of fusible extrinsic semi-conductive material containing at least one significant minor ingredient and in which the said significant minor ingredient has some desired distribution along an axis of the said body which method comprises disposing an elongated rod-shaped body of the said fusible extrinsic semiconductive material containing at least one significant minor ingredient with its major axis substantially vertical, establishing in said body a molten zone extending through the entire cross-section of the said body so as to produce two solid-liquid interfaces between the said zone and the said body, causing the said zone to traverse at least a portion of the said body along the said axis by progressively melting the material of the said body at one solid-liquid interface and progressively freezing the material of the said zone at the second solid-liquid interface, in which contact between the molten material and solid material is confined to that at the two said interfaces during a substantial portion of the said traversal, the dimensions of the molten zone being such during said substantial portion of the said traversal that the molten material is prevented from escaping at any surface not in contact with solid material by virtue of adhesive forces between the molten and solid materials at the said interfaces and by virtue of cohesive forces within the molten material itself, the said significant minor ingredient being soluble to some extent in the said fusible extrinsic semiconductive material in both the solid and the molten phases and the concentrations of the said minor ingredient being different in adjoining solid and molten phases at equilibrium.

5. The process of claim 4 in which the fusible extrinsic semiconductive material is an element selected from the group consisting of silicon and germanium.

6. A method of treating an elongated rod-shaped body of a fusible solid containing at least one minor ingredient which method comprises disposing the body with its major axis substantially vertical, establishing in said body at least two molten zones each extending through the entire cross-section of said body so as to produce two solid-liquid interfaces between each zone and the said body, causing the said molten zones to successively traverse at least a portion of the said body by progressively melting solid at one solid-liquid interface of each of said zones and progressively freezing the material of each zone at the second solid-liquid interface associated therewith, in which contact between the molten material of each zone and solid material is confined to that at the said two interfaces associated with each zone during a substantial portion of the said traversal, the dimensions of the molten zone being such that molten material is prevented from escaping at any free surface by virtue of adhesive forces between the molten and solid materials and cohesive forces within the molten material itself, the said minor ingredient being soluble to some extent in the fusible material of both the solid and the molten phases, and the concentrations of the said minor ingredient being different in adjoining solid and molten phases at equilibrium.

7. The process of claim 6 in which the fusible solid is silicon.

References Cited in the file of this patent

UNITED STATES PATENTS

| | | |
|---|---|---|
| 1,464,076 | Jones | Aug. 7, 1923 |
| 1,733,752 | Ramage | Oct. 29, 1929 |
| 2,468,816 | Duce | May 3, 1949 |
| 2,591,561 | Lester et al. | Apr. 1, 1952 |
| 2,623,105 | Shockley et al. | Dec. 23, 1952 |
| 2,629,672 | Sparks | Feb. 24, 1953 |
| 2,631,356 | Sparks et al. | Mar. 17, 1953 |
| 2,686,864 | Wroughton et al. | Aug. 17, 1954 |

FOREIGN PATENTS

| | | |
|---|---|---|
| 608,453 | Great Britain | Sept. 15, 1948 |
| 1,065,523 | France | Jan. 13, 1954 |

OTHER REFERENCES

Proc. Physical Society, vol. 49, pp. 152–158.

"Transactions of the American Society for Metals," vol. 42, 1950, page 322.